Figure 1:
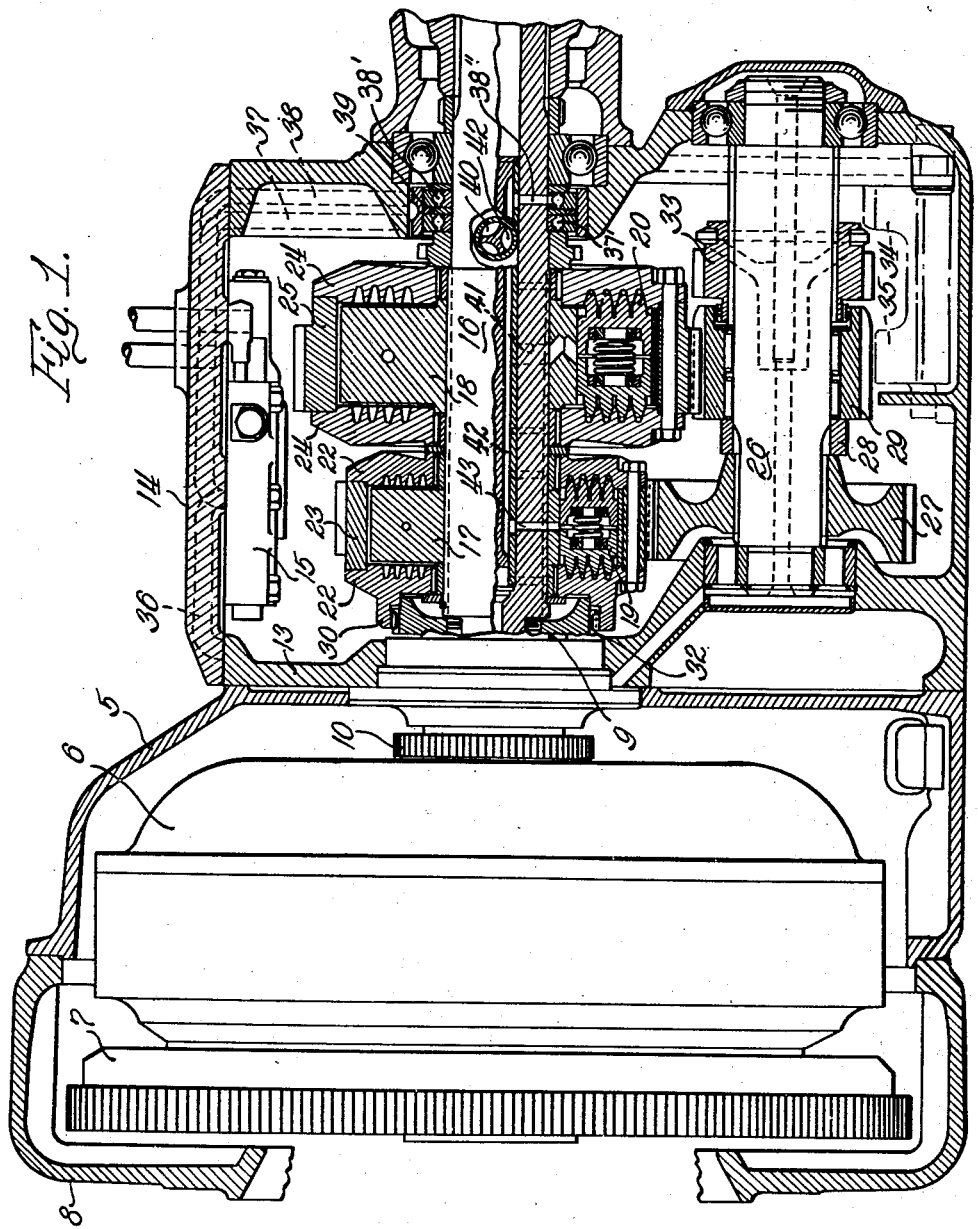

Feb. 8, 1949.    R. LAPSLEY    2,461,218
TRANSMISSION CONTROL SYSTEM
Filed Aug. 10, 1945    2 Sheets-Sheet 1

INVENTOR.
Robert Lapsley
BY Walter E. Schirmer

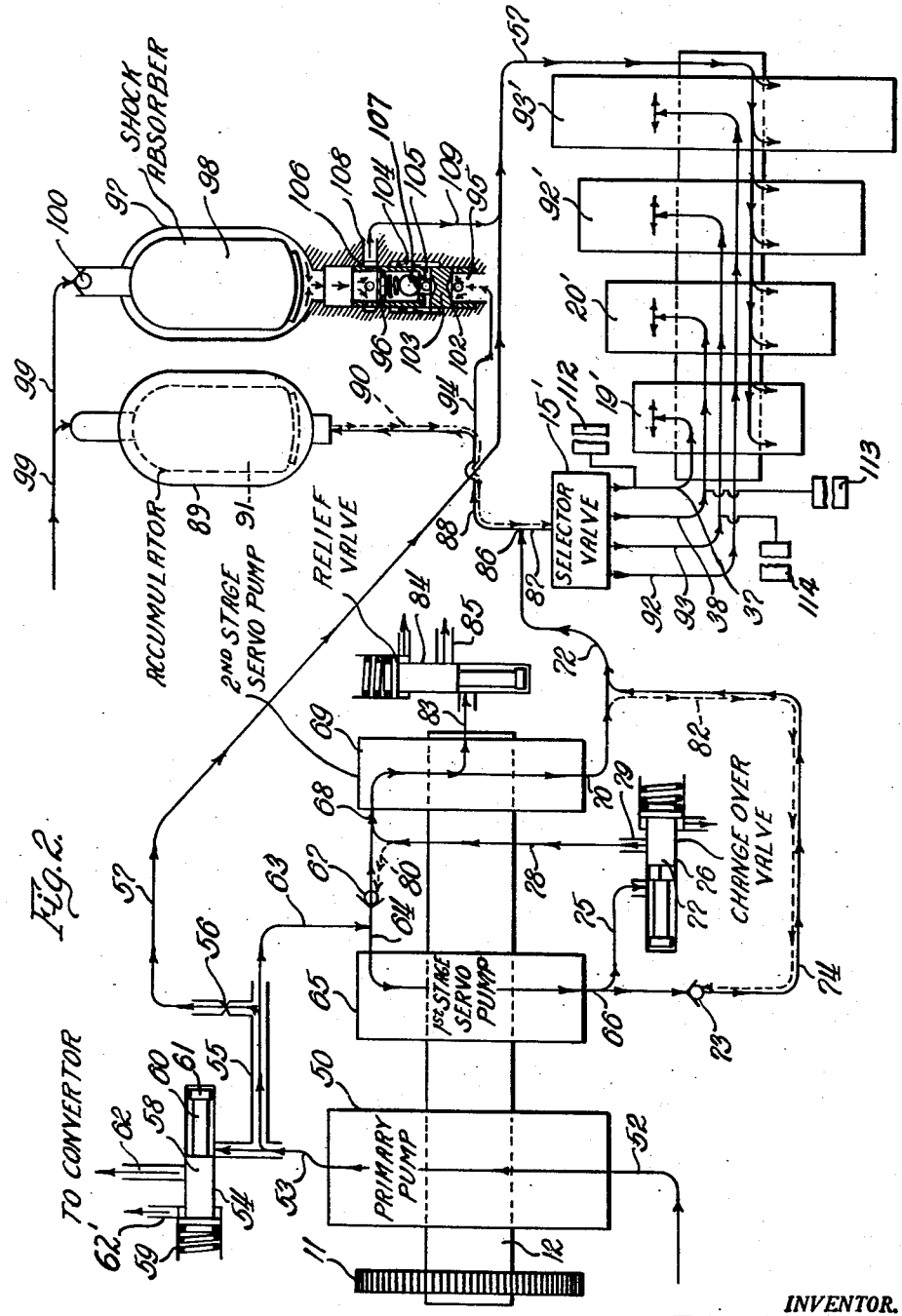

Patented Feb. 8, 1949

2,461,218

UNITED STATES PATENT OFFICE 2,461,218

TRANSMISSION CONTROL SYSTEM

Robert Lapsley, Berrien Springs, Mich., assignor to Clark Equipment Company, Buchanan, Mich., a corporation of Michigan Application August 10, 1945, Serial No. 610,037

13 Claims. (Cl. 74—364)

This invention relates to transmission control systems, and more particularly is concerned with a control system for a transmission having a fluid torque converter in combination with a plurality of gear trains for providing varying speed ratios.

More particularly the present invention relates to the fluid control system whereby operation and selection of the various gear trains is provided in conjunction with a new and novel provision for developing the fluid pressure and control of the application of this fluid pressure through the selecting control valve.

While the control system is shown and described in conjunction with a transmission of the type utilizing a torque converter with two or more gear trains in which the gears are selectively coupled for driving operation through fluid operated clutch mechanism, it is to be understood that the system itself is capable of use in other types of transmission designs, and is described in connection with the present transmission construction only for the sake of illustration.

In a transmission of this general type it is necessary to provide a fluid pressure reservoir so that when a particular fluid clutch is to be actuated, the fluid under pressure is immediately available for actuation of the clutch. At the same time it is also necessary to provide for some shock absorbing means to eliminate the possibility of the clutch engaging so quickly as to produce a shock in the transmission and thus provide an objectionable operation. At the same time it is necessary that the system be so designed as to be used in conjunction with the fluid system of the torque converter for purposes of simplicity and economy.

One of the primary features of the present invention is a provision of an accumulator or metering device so arranged as to provide for building up of fluid pressure to accelerate the engagement of the clutches which are actuated by fluid pressure and which also acts partly as a shock absorber to prevent unnecessary shock loads in the clutches. In addition to this shock absorber, means is provided in which the pressure of the fluid pressure developing source is built up, which shock absorber acts as a dumping means for automatically dumping a certain amount of fluid or oil into the lubricating portion of the system to prevent the undue shock loads which might otherwise occur.

Another feature of the present invention is the provision of a two-stage pumping arrangement to provide at low speed, such as idling, a sufficient volume of oil for the control system so that in addition to the leakage through the control mechanism and the requirements for lubrication, there will be a volume of oil such that a slight pressure will be built up whereby even at idling the control mechanism can be operated, since there is no running torque to overcome at this time. However, upon acceleration of the engine from idling position, the pump system is so arranged as to change from a parallel arrangement, which provides the greater volume of oil, to a series arrangement, which provides for increased pressure necessary to operate clutch mechanisms when considerable torque must be handled during shifting from one speed ratio to another. This pump system is automatic in operation, being so arranged as to shift from parallel operation to series operation when the pressure reaches approximately 55% of the maximum pressure which can be developed by the system. However, this particular point at which the changeover is effected may be varied, depending upon the particular circumstances of each installation.

Still another feature of the present invention provides for a division of the fluid under pressure from the outlet of the pump system, a portion of the fluid going to the selector valve which controls the operation of the various clutches for various speed ratios and the other portion being transmitted to an accumulator to build up a reservoir of fluid under pressure and to a shock absorber which provides for cushioning the shock of engagement of the clutches by dumping a certain volume of oil, this oil so dumped being added to the lubricating system so that at the moment the clutches are energized to engagement, a greater amount of lubricating oil is supplied thereto momentarily which provides for proper lubrication under the conditions of high stress that occur during clutching engagement.

Still another feature of the present arrangement resides in the provision of an initial stage of fluid pressure development which develops a certain fluid pressure for use in transmitting oil to the torque converter, this oil being transmitted to the converter only when sufficient pressure is developed, such as when the engine is accelerated beyond idling position that loading of the converter with oil is desired. In the meantime, and during the time that the engine is idling, a predetermined amount of the oil pumped through the initial pump is allowed to flow into the transmission system for lubricating purposes, thus providing for adequate lubrication of the transmission during all times that the engine is running and, with the features mentioned above, providing for additional lubrication in the transmission when the clutches are actuated.

It is to be pointed out that with the present system one advantage which is attained is that the entire system is automatic in operation, requiring no control on the part of the operator due to the provision of pressure control valves in the various fluid lines which automatically operate to distribute the fluid in the proper manner and to provide for building up of adequate pressure when such pressure is necessary for operation of the selective clutches. Furthermore, the system is very compact, since all the pumps may be arranged on a common shaft and driven from a common point in the transmission system.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 1 is a sectional view through one form of transmission which may be operated in accordance with the present control system; and Figure 2 is a more or less diagrammatic illustration of a control system embodying the present invention.

Referring now first to Figure 1, in this drawing there is described a transmission assembly comprising a bell housing 5 within which is mounted a known conventional torque converter 6, and which converter, if desired, may be of the type disclosed in my copending application, Serial No. 526,829, filed March 15, 1944. This torque converter has its impeller or pump element adapted to be driven from the flywheel 7 connected to the engine crank shaft and housed within the flywheel housing 8 into which the larger end of the bell housing is piloted in the usual manner. The output shaft of the transmission, indicated generally at 9, has connection as is known with the rotor or driven element of the torque converter 6 with the torque converter housing having mounted thereon, within the bell housing 5, a gear element 10 which is thus adapted to be driven by the crank shaft of the engine for the purpose of driving the fluid pressure pump system shown in Figure 2, the gear 10 being adapted to drive the gear 11 of Figure 2 mounted upon a shaft 12, and carrying the various pumps which will be described in detail hereinafter.

The shaft 9 extends through the bell housing 5 into the transmission housing 13, which housing is provided with a cover plate 14 carrying on its under surface a selector or control valve housing 15 enclosing suitable valve mechanism for effecting shifting of the transmission and which mechanism may if desired be similar to that disclosed in the aforementioned copending application.

Within the transmission housing 13 is mounted a transmission output shaft 16, which shaft has secured thereon as by splines or the like, two hub members 17 and 18. The hub members 17 and 18 are adapted to carry respective circumferentially arranged series of opposed pistons 19 and 20 which, when energized by fluid under pressure, operate to engage in suitable grooves carried in side plates 22 of an external annular gear element 23 surrounding the hub member 17 and in side plates 24 of a gear element 25 surrounding the hub member 18. The details of operation of these pistons is disclosed in the aforementioned copending application.

The transmission is provided with a countershaft 26 upon which is mounted the gear element 27 having meshing engagement with the gear 23 and splined to the countershaft 26. Also mounted on the countershaft 26 and separated from the gear 27 by means of the spacer 28 is a rotatable gear member 29 having constant meshing engagement with the gear 25.

It will be noted that one of the side plates 22 of the gear 23 is provided with an internal clutch tooth portion 30 having meshing engagement with a corresponding clutch portion 32 of the driving shaft 9 extending into the transmission. Thus, it will be seen that the gear 23 is constantly driven and, in turn, constantly drives the gear 27 on the countershaft which produces rotation of the countershaft. When a gear reduction is desired in the transmission, the pistons 20 of hub member 18 are actuated, thereby clutching gear 25 to shaft 16 and, with the clutch member 33 engaged with the gear 29, this gear is clutched to the countershaft and consequently gear 29 drives gear 25 at a reduced speed. When it is desired to shift to direct drive, the fluid pressure against piston 20 is released and fluid under pressure is introduced between pistons 19, thereby clutching gear 23 directly to shaft 16 and providing a direct drive from shaft 9 through shaft 16 to the propeller shaft of the vehicle.

It is obvious, of course, that additional gear reductions may be provided in which additional piston clutch mechanism such, for example, as illustrated diagrammatically in Figure 2 must be provided in each gear train.

With the present transmission, reverse drive is produced by shaft 9 driving gear 23 which, in turn, drives gear 27. This, in turn, with the clutch gear 33 shifted to the right to engage with the reverse idler 34, drives the reverse idler which has the portion 35 thereof in meshing engagement with the gear 29 to thereby drive gear 29. This, in turn, drives gear 25 in a reverse direction and actuation of the piston clutches 20 in the hub member 18 clutches gear 25 to shaft 16 to effect reverse rotation of this shaft.

The control valve member 15 is provided with an inlet port 36 which may be formed in the cover member 14 and is provided with a pair of outlet ports 37 and 38, respectively, extending into any known suitable distributor indicated generally at 39 and which, if desired, may be of the type shown in my copending application above referred to or may be of the type shown in application of Burton L. Mills, Serial No. 548,741 filed August 9, 1944, now Patent No. 2,419,906 issued April 29, 1947.

While only two fluid conduits 37 and 38 are shown, one for each of the hub clutches 17 and 18 in the transmission of Figure 1, it will be observed that with the additional piston clutches for the additional gear trains of Figure 2 additional passageways 92 and 93 are provided.

Fluid under pressure is adapted to be admitted by actuation of the selector valve 15 into passageway 38 which extends to passageway 38' of distributor 39. A passageway 38" extends from passageway 38' to a passageway 42 extending axially within output shaft 16 and which latter passageway is connected by a port 43 for actuating fluid pistons 19. The selector valve 15 is further operable to selectively admit fluid under pressure to passageway 37 which extends to and has communication with passageway 37' of distributor 39. The passageway 37' has connection by means of a suitable passageway (not shown)

with the passageway 40 extending axially within output shaft 16 and which latter passageway is connected by a port 41 for actuating fluid pistons 20. A preferred form of distributor construction for effecting the selective delivery of fluid under pressure to actuate fluid pressure responsive clutches such as that shown at 19 and 20 is disclosed in my above referred to copending application to which reference may be had.

Considering now the fluid control system for controlling the operation of the piston clutches and providing the desired actuation thereof under fluid pressure, reference is made to Figure 2. As has been previously stated, the gear 11 of shaft 12 is driven from the drive member of the torque converter and consequently is driven at all times that the engine is in operation. Mounted upon the shaft 12 adjacent the gear 11 is a primary pump, indicated diagrammatically at 50, having an inlet 52 and an outlet 53. The pump 50 may be of the gear rotor type and is preferably a large volume low pressure pump which draws oil from a storage tank or reservoir and delivers it under pressure through the outlet 53 into a control valve indicated generally at 54. However, a portion of the oil delivered by the pump 50 passes through the passageway 55 and through a restricted orifice 56 into a conduit 57 leading to a lubricating system to the transmission which will be described in detail hereinafter.

The control valve 54 includes a sliding plunger 58 which, at one end, is enlarged to receive thereabout a spring 59 so tensioned as to provide for holding the control valve in the position shown until the pressure developed by the pump 50 reaches approximately 10% of the final or ultimate pressure in the fluid system. When such pressure is reached, the plunger 58 is shifted to the left, by pressure acting against end 61 which is of slightly less diameter of the cylinder in which the plunger operates to admit fluid under pressure therebehind, against the pressure of spring 59 and the fluid under pressure from outlet 53 passes around the reduced stem 60 of the plunger into the outlet passageway 62 and from this passageway is delivered into the torque converter, there preferably being a cooling interchanger interposed between the torque converter and the reservoir or supply tank to remove the heat generated by the converter and to assure a supply of cool oil to the primary pump 50. A relief outlet 62' provides for returning fluid leaking past plunger 58 to the sump or otherwise, as desired.

In addition to the volume of oil necessary to operate the converter, a portion of the oil delivered by the pump 50 passes from the conduit 55 through the conduit 63 to the line 64. Here again the oil is divided, a portion of it passing from line 64 into the inlet of the first stage of a servo pump assembly, indicated generally at 65, the outlet of this pump being indicated at 66, another portion of the oil entering into the conduit 64, passing through check valve 67 and into the inlet 68 of the second stage servo pump 69 from which it is delivered through outlet 70 to a common pressure fluid line 72 which also receives oil under pressure from outlet 66 of the pump 65, past check valve 73 and through line 74. When the engine is idling, the fluid pressure of the servo pump mechanism indicated at 65 and passing from outlet 66 to line 75 is not sufficient to actuate the control valve indicated generally at 76. However, when the engine is accelerated beyond idling position, the pressure developed by the pump 65 is sufficient to move the piston 77 in the control valve 76 to the right as shown in Figure 2, thereby opening communication from line 75 to line 78 leading out from the outlet 79 of the control valve. This valve also is controlled by predetermined spring pressure which is preferably adjusted so that it operates to open the connection between lines 75 and 78 when the pressure reaches approximately 55% of the ultimate servo pump pressure. When this occurs, the fluid from line 77 operates through a line 80 to close check valve 67, thereby forcing all of the fluid delivered into line 63 from pump 50 into the first stage pump 65. This oil is then discharged from pump 65 through outlet 65, line 75 and line 78 to inlet 68 of the second stage pump 69. From this point the oil under pressure is discharged through outlet 70, into line 72, a back pressure line 82 assuring closing of check valve 73 to prevent pump 65 discharging into line 74. Thus, the two pumps 65 and 69 shift from parallel operation to series operation when a predetermined pressure is reached, thereby producing higher pressure but smaller volume delivery of oil through line 72 and thence to the selector control system. When the engine is idling, however, and the control valve 76 is in the position shown, the pumps operate in parallel, thereby producing a larger volume of oil but under less pressure. The change from parallel to series operation is produced automatically in accordance with the pressure developed.

Preferably, the outlet of pump 69 is so arranged as to provide a secondary discharge line 83 which leads to the high pressure control valve 84 which is so designed that when the pressure of the two pumps under high speed of the engine exceeds a predetermined maximum, the valve 84 will act as a relief valve to open the passageway from line 83 to discharge line 85, thereby relieving any excessive pressure developed when the pumps are operating in series.

From the line 72 oil under pressure is delivered to the point 86, a portion of this oil passing through line 87 into the control valve 15', the line 87 corresponding to the passageway 36 of Figure 1. However, an additional portion of the oil under pressure from line 72 passes through line 88 into the accumulator 89, which accumulator acts as a reservoir to store oil under pressure, thereby providing a sufficient volume of oil under pressure such that when one of the control selections is made in the valve 15', this oil will act to speed up engagement of the selected clutch mechanism and will also act as a cushioning means or shock absorber. The control valve 15' for purposes of this embodiment of my invention may comprise any suitable known four way valve manually operable or otherwise for effecting the selective admission of fluid under pressure into one of the passageways 37, 38, 92 or 93 and which when one of these passageways is charged with fluid under pressure the other of the passageways are under bleed. Valves of this type are well known in the art and it is believed need not be further described for an understanding of my present invention. The dotted line indicated at 90 shows the return flow of oil under pressure from the outlet 89 into the selector valve 15' when the valve is actuated to provide for flow of oil pressure through one of the selected clutch control passageways 37, 38, 92 or 93. The passageways 37 and 38 correspond to those shown in Figure 1 and are arranged to provide for selective actuation of clutch 19' or 20' or clutches 92' or 93' depending upon the selective actuation of the control mechanism within the valve 15'.

The line 88 leading from the high pressure oil line 72 also leads through line 94 to the inlet port 95 of a dump valve mechanism generally indicated at 96, associated with a shock absorber diagrammatically shown at 97. The shock absorber 97 is so designed as to provide an initial collapsible bladder 98 subject to pressure from an air pressure line 99 or controlled by spring pressure if so desired. This pressure line 99 also acts as the controlling factor for controlling pressure on the accumulator 89 which also has a collapsible bladder 91 therein. A suitable check valve is interposed in the upper end of the members 89 and 97, as indicated at 100, to provide for maintaining a predetermined pressure with the collapsible bladder against which the oil under pressure must react.

The dump valve 96 consists of a sliding plunger which is provided adjacent its lower end with a series of radial ports 102 and with a web portion 103 which acts as a piston member so that the oil under pressure from line 72 operates against the web 103 to force the plunger 96 upwardly, thereby opening ports 102 into the annular chamber 104 from whence the oil may pass around the web 103 and back into the radial ports 105 thereabove and thence through the interior of the sleeve 96 into the interior of the shock absorber 97. It will be noted that when the plunger has moved upwardly in response to pressure from line 72, the upper series of radial ports 106 are closed so that the oil under pressure enters into the chamber 97 and acts against the collapsible member 98 to provide for storing this oil under pressure within the shock absorber.

When the pressure from line 72 is directed into the control valve 15' due to actuation of the valve for energizing one of the clutches, the pressure drops against the web 103 of the dump valve 96 and the pressure of the oil within the shock absorber 97, due to the action of the expandable member 98, forces this oil outwardly. This, in turn, forces the plunger 96 downwardly, since the check valve 107 closes off ports 105, thereby preventing any escape of oil therepast and the downward movement of the plunger alines ports 106 with the passageway 108 which, in turn, through line 109 dumps the oil from the shock absorber 97 into the lubrication line 57 which leads into the transmission for lubricating the bearings upon which the gear members, such as gears 23 and 25, are mounted. Thus, simultaneous with the energization of one of the clutches within the transmission a dump action of the lubrication oil under pressure is provided from the shock absorber 97, assuring increased lubrication of the clutches at the time that they are under the most severe stress. This is a very desirable feature, since it augments the normal lubrication provided from the pump 50. Further, upon the shock absorber 98 operating to dump its charge of oil into the lubricating system it, in effect, creates a void in the pressure line which is effective to prevent overloading of the selected clutch by fluid under pressure delivered thereto by the accumulator 89 and from the pressure line 72. As above related upon dumping of the oil from shock absorber 98 into the lubricating line 57 the fluid under pressure delivered in the direction indicated by the dotted lines 90 from the accumulator 89 may divide and flow to the selector valve 15' and the line 94 leading to the shock absorber 98 so that upon engagement of the selected clutch fluid under pressure in excess of that required for actuation of such clutch is immediately taken by the shock absorber since by this time it is substantially devoid of any fluid under pressure. The accumulator 89 may partially aid in this cushioning engagement of the clutches since oil is discharged from it in effecting engagement of a selected clutch. However, the accumulator functions normally to only partially discharge oil collected therein whereas the discharge from the shock absorber is substantially complete so that the latter primarily effects the cushioning engagement of the clutches.

In the operation of the construction and the system as described when the engine is idling, the torque converter 6 is rotating at a respectively slow speed. Consequently, the shaft 12 driven from gears 10 and 11 is also rotating at a relatively slow speed.

Consequently, the large volume low pressure primary pump 50 is delivering a large quantity of oil under low pressure to the control valve 54 and also through the metering restriction 56 and lubrication line 57 to the transmission. In addition, a small portion of this oil is being delivered to the first and second stage pumps 65 and 69 which, in turn, are at this time arranged for parallel operation and consequently provide for delivery of a relatively large volume of oil at low pressure to the control valve 15' and to the accumulator 89 and shock absorber 97.

The volume of oil delivered to the line 72 at this time is such as to provide for taking care of all leakage in the system, for the proper amount of lubrication through line 57, and for building up some pressure within the accumulator 89 and shock absorber 97. This pressure is sufficient so that if the control valve 15' is operated, the selected clutch can be engaged, since at this time there is relatively no torque to be handled by the clutch and it will be capable of operation.

As soon as the engine is accelerated from idling position, however, the large volume pump 50 operates to produce sufficient pressure to actuate relief valve 58, thereby forcing oil into the converter for producing driving torque and at the same time forces oil under sufficient pressure into the line 64 to insure proper delivery of oil through the pumps 65 and 69 to start building up an outlet pressure in the accumulator 89 and shock absorber 97. As the engine continues to accelerate, the pressure developed by the pump 65 is sufficient to actuate relief valve 77, thereby changing the pumps from parallel operation to series operation, producing a higher pressure but a smaller volume of oil through discharge outlet 70 into the line 72 to produce an increased amount of pressure in the accumulator 89 and in the shock absorber 97. Under these conditions, if the speed and load on the vehicle are such as to cause actuation of another one of the clutches controlled by the control mechanism within valve 15', the oil under pressure in the accumulator 89 returns through line 90 into the control valve 95 to augment the relatively small supply of high pressure oil being introduced into line 72 to insure rapid engagement of the selected clutch. However, the dump valve in the shock absorber 97 also functions at this time due to reduction of pressure of one of the control lines 37, 38, 92 or 93 to dump a sufficient volume of oil out of the shock absorber into the lubricating system as above described. As this clutch engages and the oil line thereto becomes filled with oil under pressure to maintain clutch engagement, the delivery of oil from line 72 again builds up a fluid head in the accumulator 89 and in the shock absorber 97, thereby conditioning the system for proper rapid but cushioned engagement of any other selected clutch as the selector valve 15' is again operated.

It is therefore believed apparent that with the present control system there is provided means for assuring an adequate volume of high pressure oil to speed up the engagement of the clutch mechanism by rapidly filling up the space caused by piston displacement and insuring pressure in the oil introduced therein, while the shock absorber 97 at the same time provides a cushioning action due to the divided flow of oil under pressure from the accumulator to prevent too rapid an operation which might result in grabbing of these clutches or damaging thereof by fluid under pressure in an amount in excess of that required to effect satisfactory operation of the clutches.

It is, of course, apparent that individual shock absorbers such as diagrammatically indicated at 112, 113 and 114 can be used with each of clutches 19', 20' and 92' which in this arrangement the shock absorber 98 serves the clutch 93' which, if in the engagement of the several clutches the variation in volume of oil required for actuation of the several clutches is so great that a common shock absorber cannot be used. In this arrangement the shock absorbers 112, 113 and 114 are disposed between selector valve 15' and their respective clutches and are suitably proportioned to provide for the volume of oil required to be handled by each thereof in the engagement of the clutches with which they are associated. It should also be noted that the oil from the shock absorber 98 is added to the lubrication oil at the moment of application of pressure to one of the clutches, thereby giving an increased oil flow at the moment of clutch engagement to provide increased lubrication at the time of more severe usage. In the actual construction of a transmission, provision is made for assuring that each clutch will receive its share of the lubricating oil. In other words, the clutch construction so far as the lubricating ports are concerned, is metered for proper lubrication of each clutch.

It is therefore believed that the present system provides a novel type of control for a fluid operated transmission of the type disclosed, and while variations may be made in certain details of this construction, I do not intend to be limited except as defined by the scope and spirit of the appended claims.

I claim:

1. A fluid pressure control system for a fluid drive transmission having a plurality of fluid pressure operated clutches for selecting various speed ratios, and a selector valve for selectively controlling the operation of said clutches, comprising pump means operating to deliver fluid under pressure to said selector valve, an accumulator in said system for storing fluid under pressure, and a shock absorber for accumulating fluid under pressure, said accumulator being connected to said selector valve for providing a large volume of high pressure fluid upon actuation of said valve to speed up engagement of the selected clutch, and said shock absorber having means for dumping a volume of high pressure fluid into said transmission to reduce the pressure in the shock absorber for cushioning the engagement of said selected clutch by the high pressure fluid admitted to the latter, and to provide additional lubrication as said selected clutch is actuated.

2. A fluid pressure control system for a transmission providing for a plurality of gear ratios, pressure-operated clutch means for each ratio, a source of fluid under pressure, and a selector valve for directing said fluid to one of said clutches comprising accumulator means providing a reservoir of fluid under pressure to said selector valve for speeding up operation of said clutch means, and shock absorber means in said pressure source for dumping fluid under pressure when said selector valve is actuated.

3. A fluid pressure control system for a transmission having a plurality of gear ratios, fluid pressure-operated clutches for selectively engaging each ratio, a torque converter for delivering torque to said transmission from an engine, and a valve for selectively directing fluid under pressure to said clutches comprising a primary low pressure high volume pump adapted to be driven by said engine, a pair of secondary high pressure low volume pumps receiving fluid from said primary pump and arranged to operate in parallel when said engine is idling but including automatic pressure-responsive valve means for changing said secondary pumps to series operation when said engine accelerates beyond a predetermined point, and means including an accumulator for delivering high pressure fluid to said selecting valve.

4. The pressure control system of claim 3 including pressure responsive valve means for delivering a portion of the fluid output of said primary pump to said converter when said engine exceeds idling speed.

5. The pressure control system of claim 3 including a pressure controlled shock absorbing chamber in parallel with said accumulator for dumping high pressure fluid into said transmission for lubricating purposes upon actuation of said selecting valve.

6. A fluid control system for an assembly including a torque converter driven from a power source, a change speed transmission driven by said converter and having a plurality of gear trains therein, fluid pressure-operated clutches for connecting and disconnecting said gear trains, and a selector valve for directing fluid under pressure selectively to said clutches comprising a fluid lubrication system for said transmission, and a fluid pressure supply system for said selector valve, said fluid pressure supply system including a primary pump delivering a portion of its output to said lubrication system, means responsive to operation of said pump above idling speed of said power source for delivering fluid to said converter, and a pair of secondary pumps receiving the balance of the output of said primary pump and arranged for automatic change over from parallel operation at idling speed to series operation at a predetermined point above idling speed to deliver high pressure fluid to said selector valve.

7. The fluid control system of claim 6 characterized by the fluid pressure supply system thereof including an accumulator in parallel with said selector valve and operable to augment the fluid flow from said secondary pumps when said selector valve is actuated for accelerating the operation of the selected clutch.

8. The fluid control system of claim 6 characterized by the fluid pressure supply system thereof including parallelly connected accumulator and shock absorber in the delivery line to said selector valve, said accumulator storing fluid under high pressure for accelerating the operation of the selected clutch and said shock absorber providing a dumping action of high pressure fluid into the transmission to reduce the pressure in said shock absorber for cushioning clutch operation by high pressure fluid in the fluid pressure supply system.

9. The fluid control system of claim 6 characterized by the fluid pressure supply system thereof including accumulator means connected to the high pressure side of said secondary pumps and having an expansible chamber subject to entry of high pressure fluid providing for augumenting the volume of high pressure fluid flowing through said selector valve when actuated to operate one of said clutches.

10. The fluid control system of claim 6 characterized by the fluid pressure supply system thereof including shock absorbing means connected to the high pressure side of said secondary pumps and having an expansible chamber subject to entry of high pressure fluid and including valve means responsive to drop in pressure caused by actuation of said selector valve for discharging a portion of said fluid into said lubrication system.

11. A fluid control system for use in a transmission housing, a plurality of gear means in each of which at least one gear thereof is provided with an internal fluid pressure operated clutch operable for effecting drive selectively through said gear means, and a common control valve for selectively directing high pressure fluid to the clutches comprising, a fluid pressure developing system having its high pressure side connected to said valve, and an accumulator adapted to be connected in parallel with said valve having an expansible chamber providing for storage of high pressure fluid against a predetermined pressure in said fluid pressure developing system whereby upon actuation of said valve said accumulator fluid augments the volume of high pressure fluid flowing from the valve to the selected clutch to accelerate its operation.

12. The fluid control system of claim 11 including a shock absorber similar to said accumulator but arranged to dump its fluid into the gear means for lubrication purposes when said valve is actuated.

13. The fluid control system of claim 11 wherein said pressure developing system includes a primary pump of the low pressure high volume delivery type, a pair of secondary pumps arranged for parallel operation and connected to the discharge side of said primary pump, and pressure responsive valve means for changing said secondary pumps to series operation when the discharge pressure of one of said pumps reaches a predetermined amount.

ROBERT LAPSLEY.

REFERENCES CITED

The following references are of record in the file of this patent:

UNITED STATES PATENTS

| Number | Name | Date |
|---|---|---|
| 2,368,684 | Simpson | Feb. 6, 1945 |
| 2,373,453 | Brunker | Apr. 10, 1945 |